United States Patent
Rekimoto et al.

(10) Patent No.: US 7,526,252 B2
(45) Date of Patent: Apr. 28, 2009

(54) INFORMATION COMMUNICATION SYSTEM INFORMATION COMMUNICATION DEVICE AND INFORMATION COMMUNICATION METHOD AND COMPUTER PROGRAM

(75) Inventors: Junichi Rekimoto, Tokyo (JP); Michimune Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 212 days.

(21) Appl. No.: 10/495,002

(22) PCT Filed: Jul. 11, 2003

(86) PCT No.: PCT/JP03/08863

§ 371 (c)(1), (2), (4) Date: Dec. 3, 2004

(87) PCT Pub. No.: WO2004/025942

PCT Pub. Date: Mar. 25, 2004

(65) Prior Publication Data

US 2005/0114646 A1    May 26, 2005

(30) Foreign Application Priority Data

Sep. 12, 2002   (JP)   ............................. 2002-266602

(51) Int. Cl.
*H04B 7/00*    (2006.01)

(52) U.S. Cl. .................... 455/41.2; 455/556.2; 709/227

(58) Field of Classification Search ................ 455/41.2, 455/556.2; 709/227
See application file for complete search history.

(56) References Cited

U.S. PATENT DOCUMENTS

| | | | |
|---|---|---|---|
| 5,646,945 A * | 7/1997 | Bergler .................... 370/419 |
| 6,222,859 B1 * | 4/2001 | Yoshikawa .................. 370/522 |
| 6,272,545 B1 * | 8/2001 | Flanagin et al. ............. 709/228 |
| 6,308,201 B1 * | 10/2001 | Pivowar et al. .............. 709/214 |
| 6,349,324 B1 * | 2/2002 | Tokoro ....................... 709/200 |
| 6,411,965 B2 * | 6/2002 | Klug .......................... 707/201 |
| 6,677,976 B2 * | 1/2004 | Parker et al. ............. 348/14.08 |
| 6,681,252 B1 * | 1/2004 | Schuster et al. ............ 709/227 |
| 6,757,735 B2 * | 6/2004 | Apostolopulos et al. .... 709/231 |
| 6,845,389 B1 * | 1/2005 | Sen et al. .................... 709/204 |
| 6,857,072 B1 * | 2/2005 | Schuster et al. ............ 713/160 |

(Continued)

FOREIGN PATENT DOCUMENTS

| | | |
|---|---|---|
| JP | 7-87210 | 3/1995 |
| JP | 2002-118626 | 4/2002 |
| JP | 2002-132477 | 5/2002 |

*Primary Examiner*—Matthew D Anderson
*Assistant Examiner*—April S Guzman
(74) *Attorney, Agent, or Firm*—Finnegan, Henderson, Farabow, Garrett & Dunner, L.L.P.

(57) ABSTRACT

An information communication system includes a first telephone operated by a first user, first proximity communication means operated when a first device comes into its vicinity so as to connect the both, a second telephone operated by a second user, and second proximity communication means operated when a second device comes into its vicinity so as to connect the both. The first telephone reads an IP address of the first device via the first proximity communication means, transmits it to the second telephone via a telephone network, and notifies it to the second device via the second proximity communication means. By link operation between a telephone and an electronic device in its vicinity, it is possible to share information and exchange information with a conversation partner via the telephone.

29 Claims, 12 Drawing Sheets

U.S. PATENT DOCUMENTS

| | | | |
|---|---|---|---|
| 6,901,240 B2* | 5/2005 | Tokoro | 455/3.03 |
| 6,912,577 B1* | 6/2005 | Sabatier et al. | 709/227 |
| 6,941,378 B2* | 9/2005 | Apostolopoulos et al. | 709/231 |
| 6,957,040 B1* | 10/2005 | Tanaka | 455/3.06 |
| 6,983,370 B2* | 1/2006 | Eaton et al. | 713/182 |
| 6,996,618 B2* | 2/2006 | Apostolopoulos et al. | 709/227 |
| 7,072,941 B2* | 7/2006 | Griffin et al. | 709/204 |
| 7,076,554 B1* | 7/2006 | Kobayashi | 709/227 |
| 7,200,402 B2* | 4/2007 | Apostolopoulos et al. | 455/442 |
| 7,225,260 B2* | 5/2007 | Herrod | 709/227 |
| 2003/0007515 A1* | 1/2003 | Apostolopoulos et al. | 370/503 |
| 2003/0056220 A1* | 3/2003 | Thornton et al. | 725/62 |
| 2003/0074451 A1* | 4/2003 | Parker et al. | 709/227 |
| 2003/0139171 A1 | 7/2003 | Kuita | |
| 2004/0010541 A1* | 1/2004 | Allen et al. | 709/203 |
| 2004/0024884 A1* | 2/2004 | Rekimoto et al. | 709/228 |
| 2004/0077313 A1* | 4/2004 | Oba et al. | 455/41.2 |
| 2004/0214524 A1* | 10/2004 | Noda et al. | 455/41.2 |
| 2004/0235504 A1* | 11/2004 | Kohno et al. | 455/466 |
| 2004/0246950 A1* | 12/2004 | Parker et al. | 370/356 |
| 2004/0247023 A1* | 12/2004 | Sasai et al. | 375/220 |
| 2005/0025117 A1* | 2/2005 | Inagaki et al. | 370/350 |
| 2005/0044372 A1* | 2/2005 | Aull et al. | 713/176 |
| 2005/0053089 A1* | 3/2005 | Abou-Chakra et al. | 370/464 |
| 2005/0070224 A1* | 3/2005 | Ho et al. | 455/41.2 |
| 2005/0086171 A1* | 4/2005 | Abe et al. | 705/51 |
| 2005/0250447 A1* | 11/2005 | Tokoro | 455/41.2 |
| 2006/0068703 A1* | 3/2006 | Ng et al. | 455/41.2 |

* cited by examiner ness of communication is very complicated.

INFORMATION COMMUNICATION SYSTEM INFORMATION COMMUNICATION DEVICE AND INFORMATION COMMUNICATION METHOD AND COMPUTER PROGRAM

TECHNICAL FIELD

The present invention relates to an information communication system, an information communication apparatus and an information communication method, and a computer program for performing information sharing and information exchange among a plurality of users, and particularly, to an information communication system, and information communication apparatus and an information communication method, and a computer program for performing information sharing and information exchange with a person with whom a conversation is being held by telephone by using electronic devices in proximity to telephone sets.

More specifically, the present invention relates to an information communication system, an information communication apparatus and an information communication method, and a computer program for performing information sharing and information exchange with a person with whom a conversation is being held by telephone through an associated operation of a telephone set and an electronic device in proximity thereto, and particularly, to an information communication system, an information communication apparatus and an information communication method, and a computer program for realizing information sharing/information exchange with a person with whom a conversation is being held by telephone through an easy operation and for ensuring confidentiality of communication.

BACKGROUND ART

Telephones have already been established as a convenient means for communication with a person at a remote location in daily life. Many situations are present in which one wishes to share information with a person with whom a conversation is being held by telephone. For example, one may wish to share a computer screen in front of him/her with a called person to make arrangements during a telephone call.

In a current telephone system (including cellular phones), however, no associated function with a device near a user is provided. Thus, the following complicated operations need to be performed in order to share information with a person to whom a telephone call is being made.

(1) To ask a telephone partner a network address of a device in front of the partner.
(2) The partner answers it over the telephone (verbally in conversation).
(3) To tell the telephone partner a network address of a device in front of him/her verbally in conversation.
(4) To activate a screen sharing application (for example "a sharing blackboard" on each device to input the address of the partner.

In addition, the following information handling is also needed verbally in conversation or through manual operations when one wishes to transfer a file to a person to whom a telephone call is being made.

(1) To ask the telephone partner an address (a mail address or an address to which the file is to be transferred) and let the partner tell it verbally in conversation
(2) Input the address manually to a device in front of him/her to transfer the file.

In these operations, since only the addresses of the partners are exchanged through a secured telephone network, transmitted information cannot be protected from an external third party.. When confidentiality of communication is ensured, a key for encryption also needs to be shared with the telephone partner, and performing this by verbal information exchange and manual input is very complicated.

On the other hand, a technique for providing a telephone function through the Internet network has become common like so-called "IP telephone," so that it is expected that a telephone set can transmit and receive an IP packet.

DISCLOSURE OF THE INVENTION

It is an object of the present invention to provide an excellent information communication system, an information communication apparatus and an information communication method, and a computer program which allow information sharing and information exchange to be performed among a plurality of users.

It is an additional object of the present invention to provide an excellent information communication system, an information communication apparatus and an information communication method, and a computer program which allow information sharing or information exchange to be performed with a partner with whom a conversation is being held by telephone though a cooperating operation of a telephone set and an electronic device in proximity thereto.

It is a further object of the present invention to provide an excellent information communication system, an information communication apparatus and an information communication method, and a computer program which realize information sharing/information exchange with a partner with whom a conversation is being held by telephone through an easy operation and ensure confidentiality of communication.

The present invention has been made in view of the aforementioned problems, and provides an information communication system for performing information exchange among a plurality of users, comprising:

a first telephone and a first device operated by a first user;

first proximity communication means activated by the above-mentioned first telephone brought closer to the above-mentioned first device to connect the both;

a second telephone and a second device operated by a second user;

second proximity communication means activated by the above-mentioned second telephone brought closer to the above-mentioned second device to connect the both; and a wide area transmission path connecting the above-mentioned first device with the above-mentioned second device.

The "system" herein referred to means in which a plurality of apparatus (or functional modules for realizing a specific function) are gathered logically, and whether or not the respective apparatuses or functional modules are present in a single housing is not particularly significant.

According to the information communication system of the present invention, in response to the activation of the above-mentioned first proximity communication means, the above-mentioned first telephone reads an access method to the above-mentioned first device on the wide area transmission path from the above-mentioned first device, transmits it to the above-mentioned second telephone through a telephone network. Next, the above-mentioned second telephone notifies the above-mentioned second device of the access method to the above-mentioned first device on the wide area transmission path through the above-mentioned second proximity communication means, and then the above-mentioned second device can establish connection with the above-mentioned first device in accordance with the access method to the above-mentioned first device on the wide area transmission path.

In these operations, however, only the partner addresses are exchanged via a secured telephone network, so that the information actually transmitted between devices A and B cannot be protected from an external third party. When confidentiality of communication is ensured, a key for encryption also needs to be shared with the telephone partner, and it is very complicated to perform this by verbal information exchange and manual input. Thus, when the above-mentioned first cooperating means also transmits an encryption key for use in information communication through a wide area network, the encryption key can be securely transmitted and confidentiality of the transmission path between the devices after the connection establishment can be maintained.

In other words, according to the information communication system of the present invention, it is possible to realize information sharing/information exchange with a person with whom a conversation is being held by telephone through an easy operation and to ensure confidentiality of communication.

Here, the information communication system of according to the present invention may further have means for sharing user interaction performed on the above-mentioned first and second devices between them through a transmission path established as connection by the above-mentioned third cooperating means.

A sharing blackboard is a system which allows sharing of contents of painting or other interaction on a work screen presented in each remote information device. When the sharing blackboard is introduced to the information communication system according to the present invention, two persons who are having a conversation by telephone start a sharing blackboard application. Both persons do not need to check IP addresses of the respective devices or the like, and have only to bring the telephone closer to the device A or B when they wish to use the telephone as a sharing blackboard.

Also, the information communication system according to the present invention may further have means for transferring a file from one of the above-mentioned first and second devices to the other through a transmission path established as the connection by the above-mentioned third cooperating means.

In addition, the information communication system according to the present invention may further have means for transferring an access method to contents provided on the above-mentioned wide area network from one of the above-mentioned first and second devices to the other through a transmission path established as the connection by the above-mentioned third cooperating means.

For example, information required for streaming playback can be exchanged between the devices through an easy operation, and both can share streaming broadcast through the easy operation.

In addition, the information communication system according to the present invention may further have means for transferring contents acquired in one of the above-mentioned first and second devices to the other through a transmission path established as the connection by the above-mentioned third cooperating means.

For example, a need exists that one wishes communication with a partner with whom a conversation is being held by a mobile phone through another medium such as an images in addition to voice. When the information communication system according to the present invention is utilized, a conversation by telephone can be extended to a videophone as required with the cooperating operation of the telephone and the device.

Other objects, characteristics and advantages of the present invention will be apparent from detailed description based on an embodiment of the present invention, later described, and appended drawings.

BEST MODE FOR CARRYING OUT THE INVENTION

An embodiment of the present invention is hereinafter described with reference to the drawings.

Figure 1:
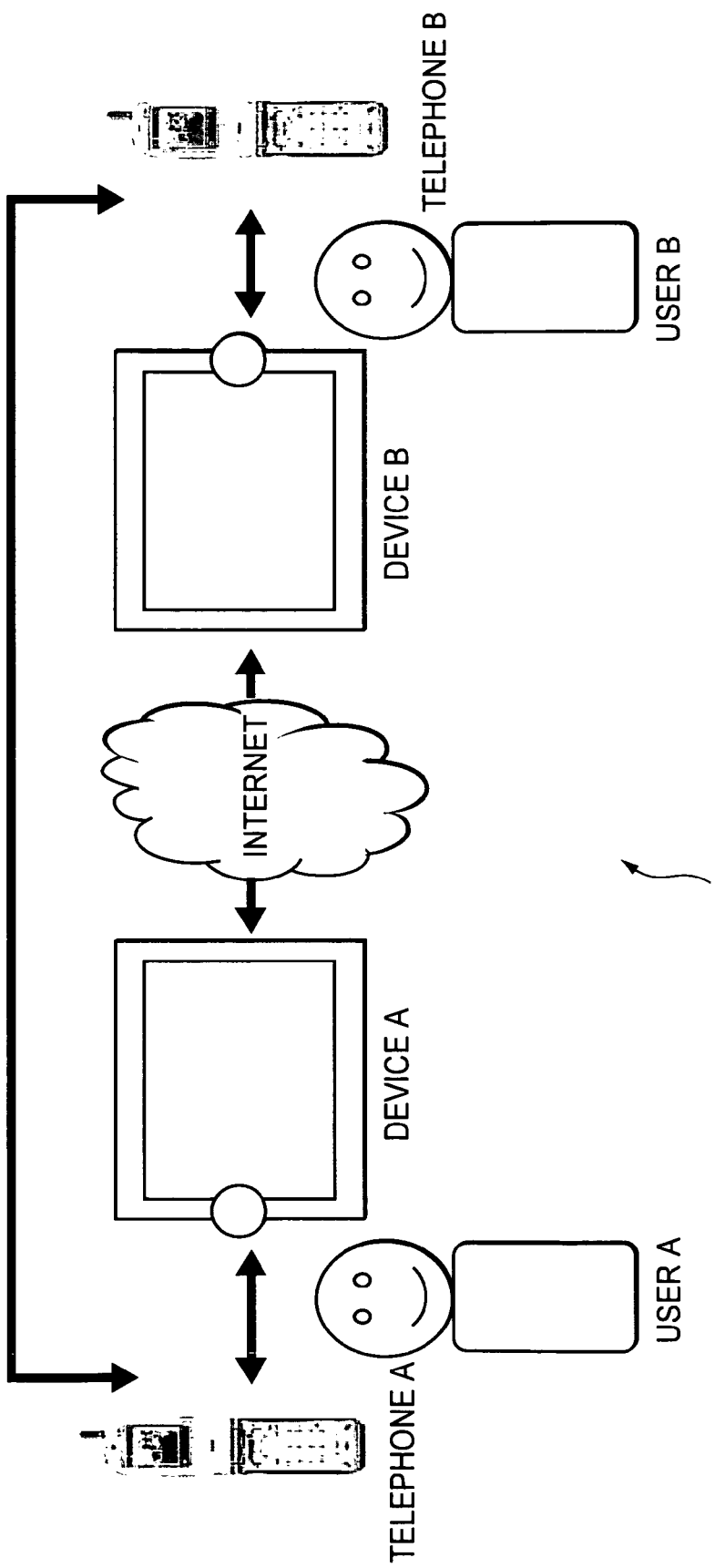
FIG. 1 is a diagram schematically showing a system configuration of an information communication system according to an embodiment of the present invention.

FIG. 1 schematically shows the system configuration of an information communication system according to an embodiment of the present invention. According to the shown information communication system, as later described, information sharing/information exchange with a partner with whom a conversation is being held by telephone are realized through an easy operation, and confidentiality of communication can be ensured.

In the shown information communication system, users A and B are having a conversation over their telephones A and B. Telephones herein referred to include an IP telephone which is a telephone network constructed on the basis of an IP protocol on the Internet (VoIP: Voice over Internet Protocol) in addition to an installed telephone connected through exchanges over a public telephone network or a mobile phone.

The respective users A and B use devices A and B in proximity to their telephones A and B. The devices herein referred to include an information appliance or the like connected to the Internet in addition to an information processing device provided with communication means through a wide area network such as the Internet, such as a personal computer and a PDA (Personal Digital Assistant). Since both of the device A and B are connected to the Internet, mutual communication can be performed after a predetermined connection establishing procedure if their addresses are known, thereby allowing information sharing with a sharing blackboard or the like and information exchange such as file transfer.

Here, the device A and the telephone A operated by the user A and the device B and the telephone B operated by the user B are configured to enable easy information exchange through proximity information communication means. The details of the configuration and operational characteristics of this proximity information communication means are later described.

Figure 2:
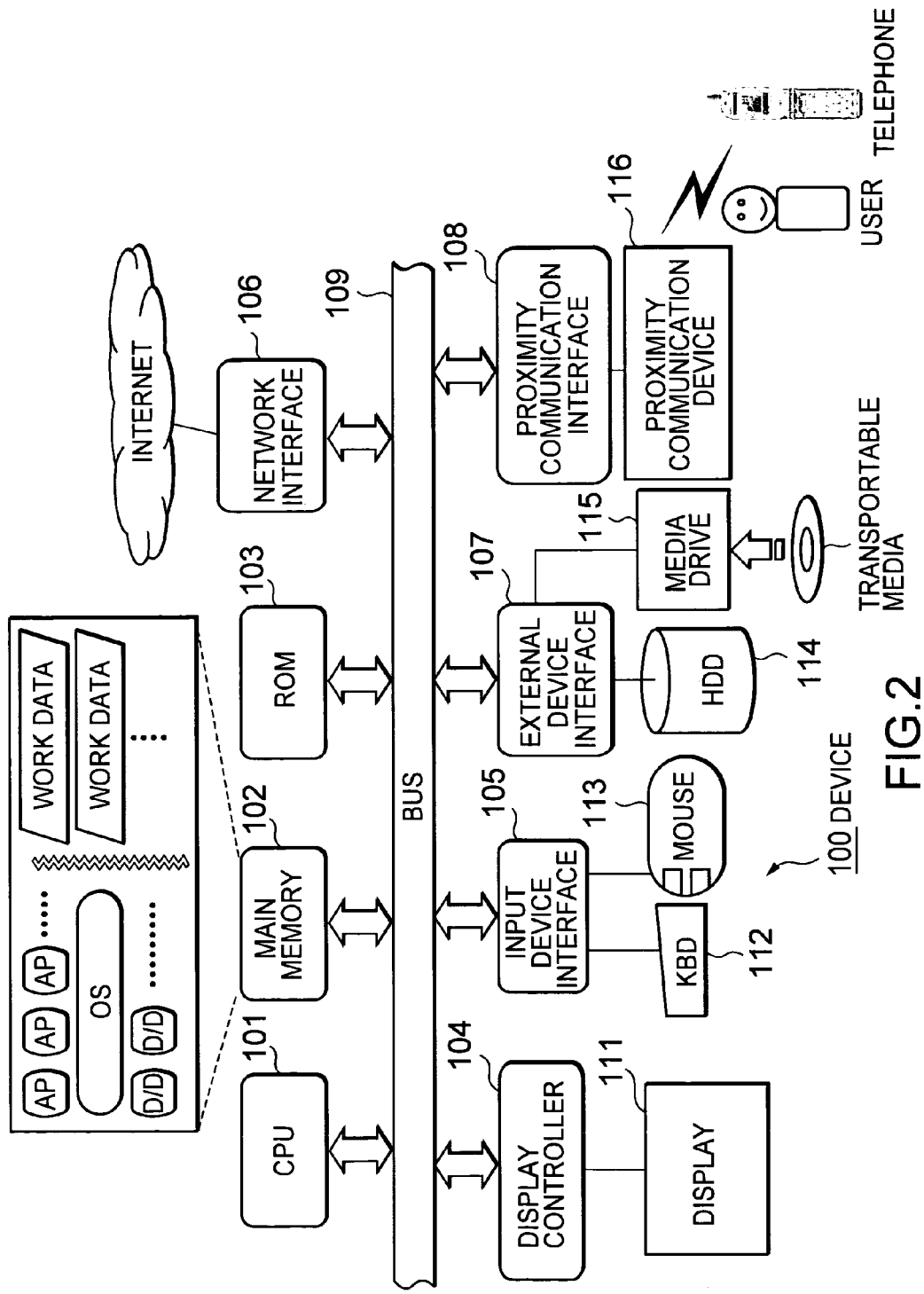
FIG. 2 is a diagram schematically showing a hardware configuration of a device A or B used in proximity to a user operating a telephone.

FIG. 2 schematically shows a hardware configuration of the device A or B used in proximity to the user who operates the telephone. Each component is hereinafter described.

A CPU (Central Processing Unit) 101 which is a main controller executes various types of applications under control of an operating system (OS). As shown, the CPU 101 is mutually connected to other devices (later described) through a bus 109.

A main memory 102 is a storage device used to load a program code executed in the CPU 101 or to temporarily store work data of an execution program, and for example, a semiconductor memory such has a DRAM (Dynamic RAM) is used therefor. For example, the operating system, a device driver (D/D) for input/output manipulations of various types of hardware including a keyboard 112 and a touchpad 113, an application (AP) for realizing information sharing/information exchange with a partner with whom a conversation is being held by telephone through a cooperating function with a telephone, and the like are loaded into the main memory 102 as the execution program. Also, work data during processing of these programs is temporarily stored in the main memory 102.

In addition, a ROM (Read Only Memory) 103 is a semiconductor memory for permanently storing data, and for example, a self-diagnostic test at the time of start (POST: Power On Self Test), a program code for hardware input/output (BIOS: Basic Input/Output System), and the like are written thereinto.

A display controller 104 is a dedicated controller to actually process a painting instruction issued by the CPU 101. Painting data processed by the display controller 103 is once written, for example, into a frame buffer (not shown), and then output to a screen by a display 111 formed of a CRT (Cathode Ray Tube) display, an LCD (Liquid Crystal Display), or the like. The display screen on the display 111 typically has a function of providing a user with visual feedback of input contents from the user, processing results by an application, or errors and other system messages.

An input device interface 105 is a device for connecting a user input device such as a keyboard 4 or a touchpad 6 to a main body of a device 100. The keyboard 112 and a mouse 113 are supplied with dedicated interrupt levels, respectively. When a user input operation is applied thereto, an interrupt request is produced. In the CPU 101, in response to this interrupt request, a cooperating interrupt handler such as a driver for the keyboard or a driver for the mouse is activated to acquire the user input into the system.

A network interface 106 can connect the device 100 to a local network such as a LAN (Local Area Network) and to a wide area network such as the Internet in accordance with a predetermined communication protocol such as the Ethernet (registered trademark).

On the network, a plurality of host terminals (not shown) are connected in a transparent state to construct a distributed computing environment. On the network, service of delivery of software programs, data contents or the like can be performed. For example, the operating system, a device driver for manipulations of various types of hardware, an application (AP) for realizing information sharing/information exchange with a partner with whom a conversation is being held by telephone through a cooperating function with a telephone, or a program module such as an update version thereof and the like are downloaded through the network.

An external device interface 107 is a device for connecting an external device such as a hard disk drive (HDD) 114 or a media drive 115 to the operation information processing apparatus 100.

The HDD 114 is an external storage device (known) which fixedly has a magnetic disk as a storage carrier, and is more favorable than another external storage device in terms of its storage capacity, data transfer speed and the like. Putting a software program on the HDD 114 in an executable state is referred to as "install" of the program into the system. Typically, in the HDD 114, a program code of the operating system which should be executed by the CPU 101, an application program, a device drive and the like are stored in a nonvolatile manner.

The media drive 115 is a device for loading a transportable medium such as a CD (Compact Disc), an MO (Magneto-Optical disc), a DVD (Digital Versatile Disc) to access its data recording surface.

The transportable medium is used mainly for the purpose of performing backup of a software program, a data file and the like as data of a computer readable type, and transfer of them between systems (including sale, distribution, delivery). For example, an application, an operating system, a device drive for operation of various types of hardware and the like can be physically distributed or delivered among a plurality of devices by using these transportable media.

A proximity communication interface 108 is a protocol interface to perform easy information exchange with a telephone (later described) operated by a user of the device 100 in proximity to the device 100 through a proximity communication device 116. The details of the configuration and the operational characteristics of this proximity communication interface 108 are later described.

Figure 3:
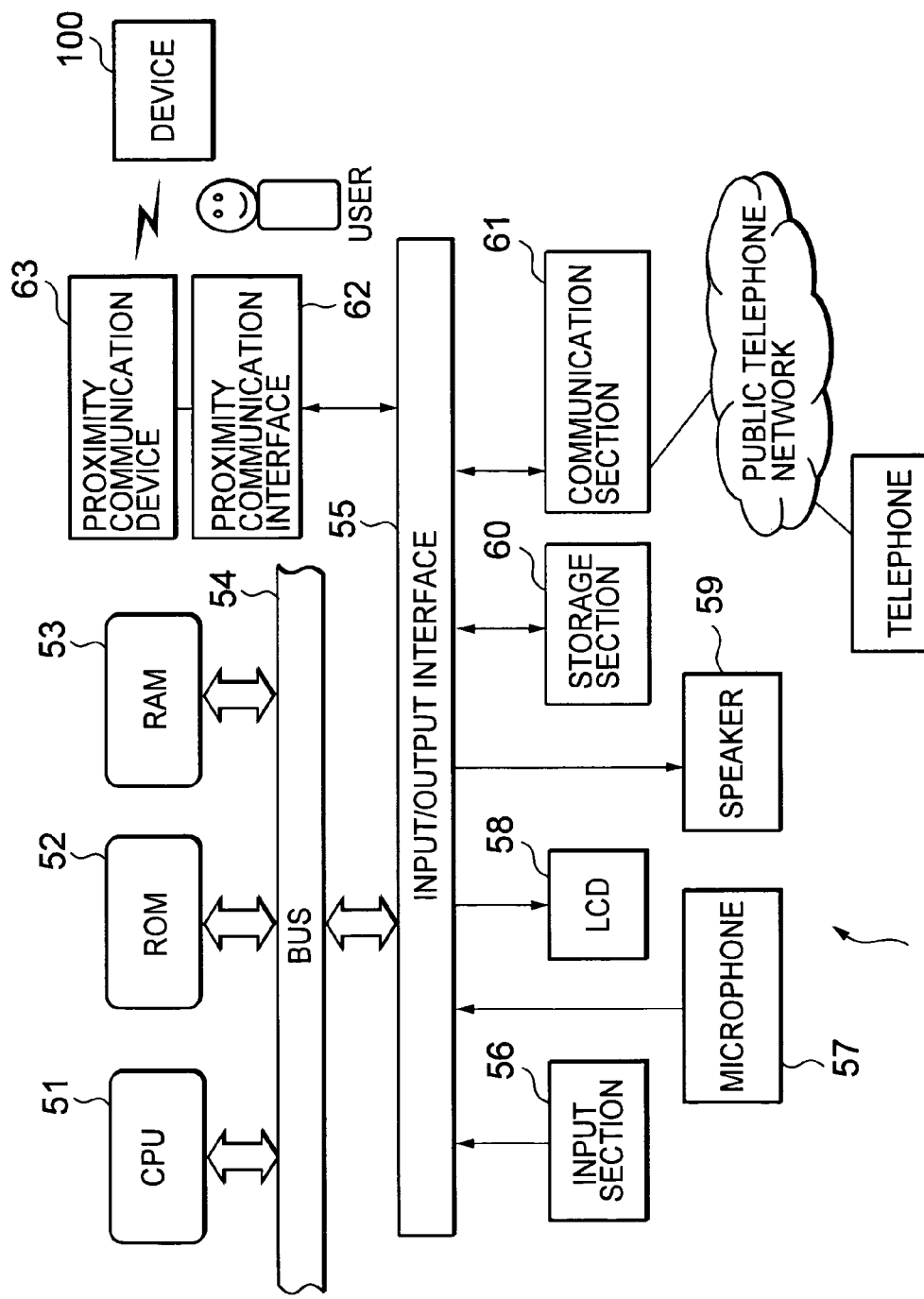
FIG. 3 is a diagram schematically showing a hardware configuration of a telephone 60 used in the information communication system according to an embodiment of the present invention.

FIG. 3 schematically shows the hardware configuration of a telephone 50 used in the information communication system according to the present embodiment.

A CPU 51 which is a main controller executes various types of applications under control of an operating system (OS). As shown, the CPU 51 is mutually connected to other devices (later described) through a bus 54.

A ROM 52 is a read only memory used to permanently store a self-diagnostic test program executed at the time of start of the telephone 50, a code group (BIOS) for performing respective input/output operations through the bus 54. A RAM 53 is a readable/writable memory used to store a program code executed in the CPU 51 or temporarily store work data during execution.

In addition, the telephone 50 is provided with devices such as a user input section 56 formed of manipulation buttons and the like, a microphone 57 for voice input, a liquid crystal display 58 for screen output, a speaker 59 for voice output, a storage section 60 for saving various types of information, a communication section 61 for making connection to a network, and a proximity interface 62. These devices are connected to the bus 54 through an input/output interface 55.

The communication section 61 connects the telephone 50 to a public telephone network, a local network such as a LAN, or a wide area network such as the Internet. On the network, a plurality of host devices are present, and the aforementioned device 100 can access these host devices in accordance with a predetermined access method. The access method herein referred to include a network address such as an IP address, a URL (Uniform Resource Locator)/URI (Uniform Resource Identifier), a telephone number, another identification number and the like.

The proximity communication interface 62 is a protocol interface for a user of the telephone 50 to perform easy information exchange with the device 100 (as described above) in proximity thereto by a proximity communication device 63.

In the present embodiment, as the proximity communication interfaces 62 and 108, for example, infrared communication, an electromagnetic induction coupling system, an electrostatic coupling system, an RF-ID system and the like can be employed. In the following, description is made for the configuration and operational characteristics of the respective proximity data communication systems.

Figure 4:
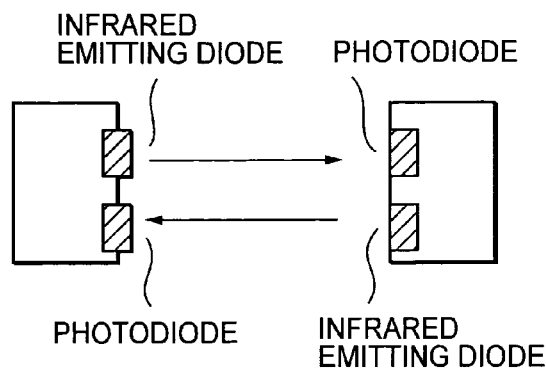
FIG. 4 is a diagram showing a configuration of a proximity communication device according to an infrared communication system.

FIG. 4 shows the configuration of a proximity communication device in the infrared communication system. As shown in FIG. 4, the proximity communication device is formed of a combination of an infrared emitting diode as transmitting means and a photodiode as receiving means. Typically, the infrared emitting diode has a limited viewing angle, and proximity communication is performed by bringing proximity communication devices closer to each other to make the photodiode of one proximity communication device come into the visual field of the infrared emitting diode of the other proximity communication device as a trigger.

For example, in the field of consumer electric/electronic devices such as household electrical products for example, it is possible to use "an infrared remote controller" employing an AM modulation system as means for remotely inputting a user manipulation command to the device and an IrDA (Infrared Data Association) employed as means for wireless communication between the respective information terminals in the field of information processing devices.

Figure 5:
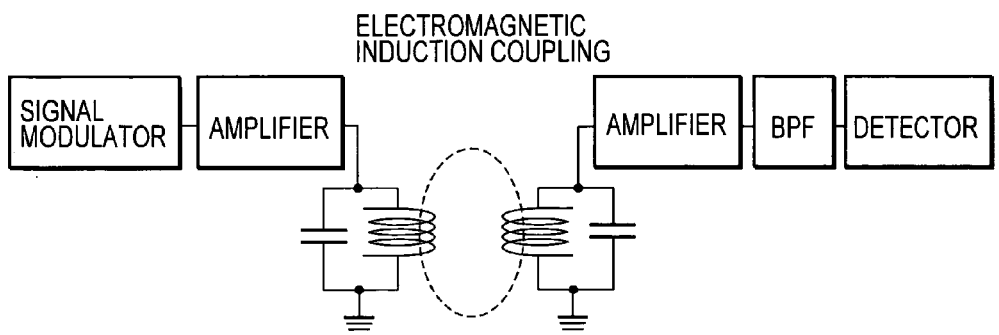
FIG. 5 is a diagram showing the configuration of a proximity communication device according to an electromagnetic induction coupling system.

FIG. 5 shows the configuration of a proximity communication device in the electromagnetic induction coupling system. In FIG. 5, transmitting means is disposed on the left of an area where an electromagnetic induction coupling effect works, and receiving means is disposed on the right thereof.

The transmitting means of the electromagnetic induction coupling system is formed of a signal modulator, an amplifier, and a transmission section consisting of a capacitor and a coil connected in parallel. The receiving means is formed of a reception section consisting of a capacitor and a coil connected in parallel, an amplifier, a band-pass filter (BPF) for passing only predetermined frequency components, and a detector.

In the transmitting means, when an alternating signal representing transmission data is applied, current is produced in the coil of the transmission section owing to an electromagnetic induction effect. In response thereto, current produced by an electromagnetic induction coupling effect passes through the coil on the receiving means in sufficient proximity to the transmitting means. This current is amplified, filtered, and detected, and then the original transmission signal can be acquired.

It should be noted that, although only one-directional communication is illustrated in the shown example, it can be extended to bi-directional communication by providing transmitting means and receiving means for each device.

Figure 6:
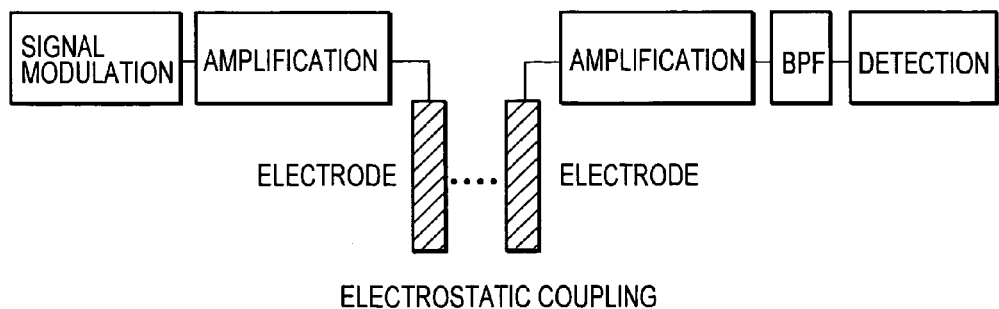
FIG. 6 is a diagram showing the configuration of a proximity communication device according to an electrostatic coupling system.

In addition, FIG. 6 shows the configuration of a proximity communication device in the electrostatic coupling system. As shown in FIG. 6, each of transmitting means and receiving means has an opposite electrode constructing each pole of a capacitor.

The transmitting means has a signal modulator and an amplifier and supplies an alternating signal representing transmission data to a transmitting electrode. In contrast, on the side of the receiving means, current is produced in accordance with an amount of accumulated charge on the transmitting electrode by an electrostatic coupling effect. This current is amplified, filtered, and detected, and then the original transmitted signal can be acquired.

Figure 7:
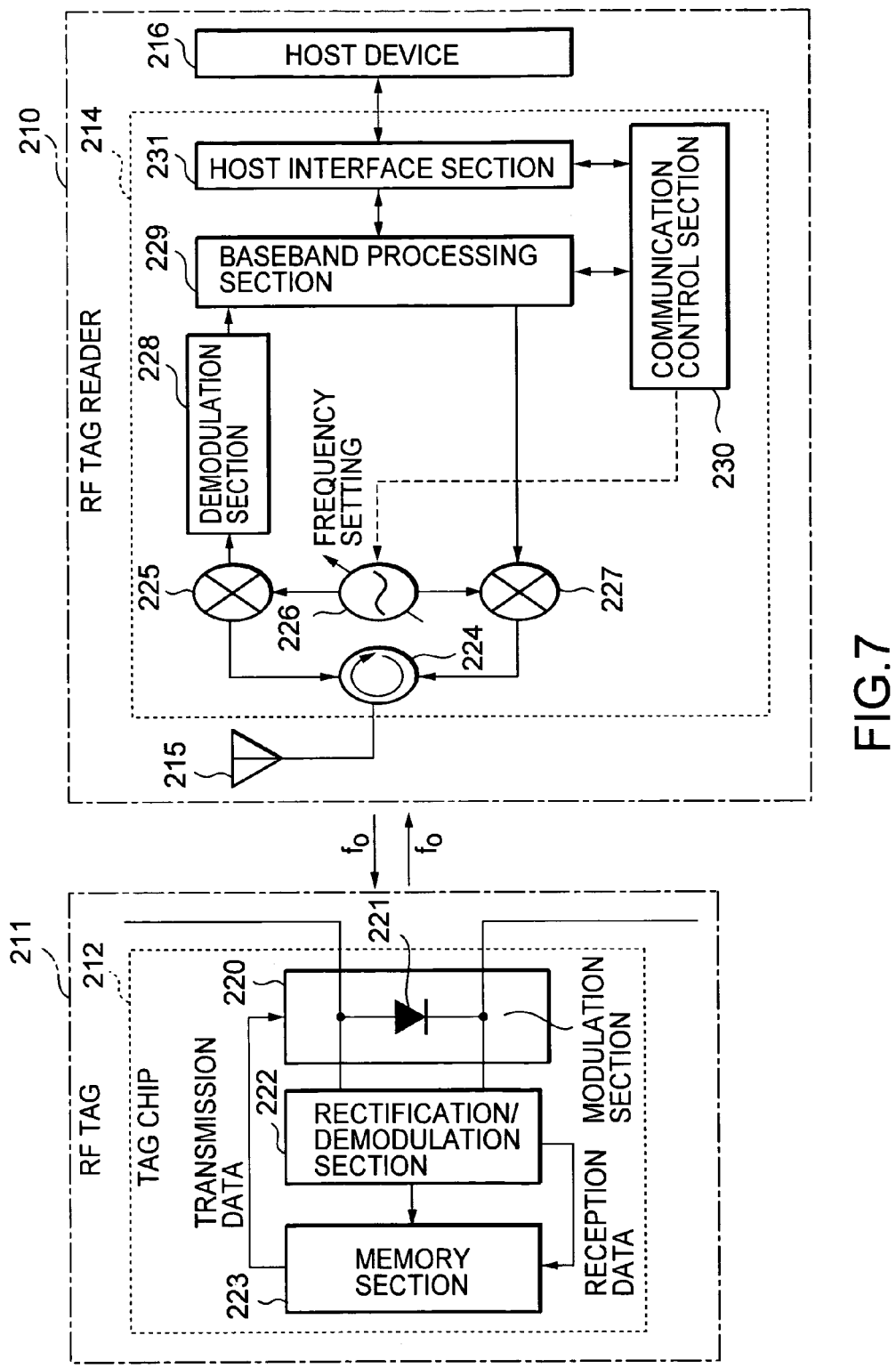
FIG. 7 is a diagram showing the configuration of a proximity communication device according to an RF-ID system.

FIG. 7 shows the configuration of a proximity communication device in the RF-ID system. An ID recognition system in the RF-ID is utilized by combining an RF tag attached to the telephone 50 with an ID recognition device attached to the side of the device 100 and reading an RF-ID from this RF tag.

In FIG. 7, a reference numeral 211 is an RF tag for carrying ID information and is formed of a tag chip 212 and an antenna 213. As the antenna 213, a half-wave dipole antenna or the like is used. The tag chip 212 is formed of a modulation section 220, a rectification/demodulation section 222, and a memory section 223.

A radio wave $f_0$ transmitted from an RF tag reader 210 serving as the ID recognition device is received by the antenna 213 and rectified by the rectification/demodulation section 222 for conversion into direct current power. Simultaneously, the power starts the operation of a demodulation function to recognize that it is a read signal to the wireless tag 211. The produced power is also supplied to the memory section 223 and the modulation section 220.

The memory section 223 reads ID information stored therein and sends it as transmission data to the modulation section 220. The modulation section 220 is formed of a diode switch 221, and the transmission data causes the diode switch 221 to repeat on/off operations. At this point, the radio wave from the RF tag reader 210 is absorbed on the side of the RF tag 211. The radio wave from the RF tag reader 110 is reflected back to the transmitting part, and such a communication method is called "a back scatter system." In this manner, the RF tag 211 can transmit internal information to the side of the RF tag reader 210 with no power source.

On the other hand, the RF tag reader 210 is formed of a tag read module 214 and an antenna 215 connected to this tag read module 214, and is used in connection to a host device. The host device is, for example, an information terminal such as the aforementioned device 100, and notifies a communication control section 230 of a read instruction of the RF tag 211 via a host interface section 231. When a baseband processing section 229 receives a tag read command from the communication control section 230, it performs edits on transmission data and filtering, and then transmits a baseband signal to an ASK (Amplitude Shift Keying) modulation section 227. The ASK modulation section 227 performs ASK modulation at a frequency $f_0$ of a frequency synthesizer 226. The frequency setting of the frequency synthesizer 226 is performed by the communication control section 230. The transmission signal subjected to the ASK modulation passes through a circulator 224 and is radiated toward the RF tag 211 from the antenna 215.

A reflected signal back from the RF tag 211 in the back scatter system is at the same frequency as the signal transmitted from the RF tag reader 210, received by the antenna 215, and then input to a mixer 225. Since the local frequency $f_0$ identical to that at the time of transmission is input to the mixer 225, a signal subjected to modulation on the side of the RF tag 211 appears at the output thereof. In a demodulation section 228, demodulation is performed on data consisting of I/O from the signal before transmission to the baseband processing section 229. The baseband processing section 229 decodes the data to acquire ID information in the RF tag 211. This data is transferred to the host device from the host interface section 231 in accordance with an instruction of the communication control section 230.

As described above, the RF tag reader 210 can read information in the RF tag 211. It should be noted that the RF tag reader 210 can perform a write operation to the RF tag 211 through operations similar to the aforementioned ones.

Figure 8:
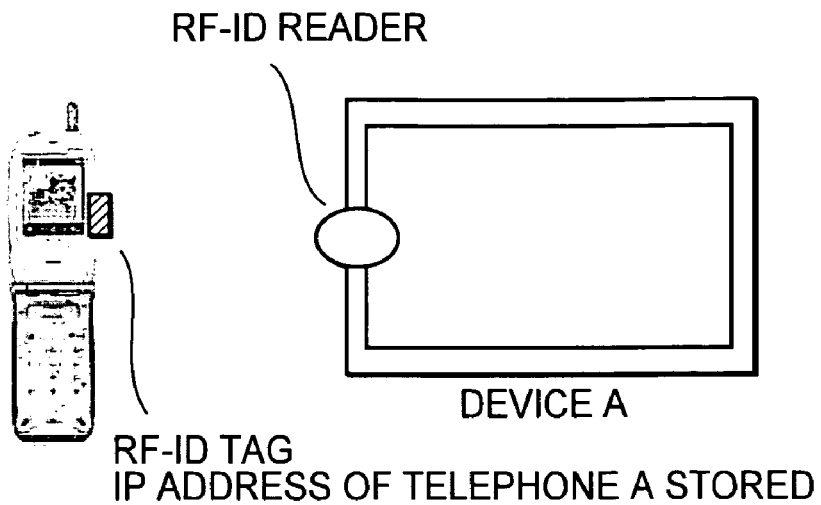
FIG. 8 is a diagram showing an example in which the RF-ID system is employed in the information communication system according to the embodiment of the present invention.

When the RF-ID system is applied to the information communication system according to the present embodiment, an RF-ID is provided for the telephone 50, for example. As an ID, an IP address of a wireless LAN card loaded into the telephone is stored. On the other hand, an RF-ID reader is provided on the side of the device 100, and an ID signal read from the RF-ID is transmitted to the device 100 through serial communication or the like (see FIG. 8).

Figure 9:
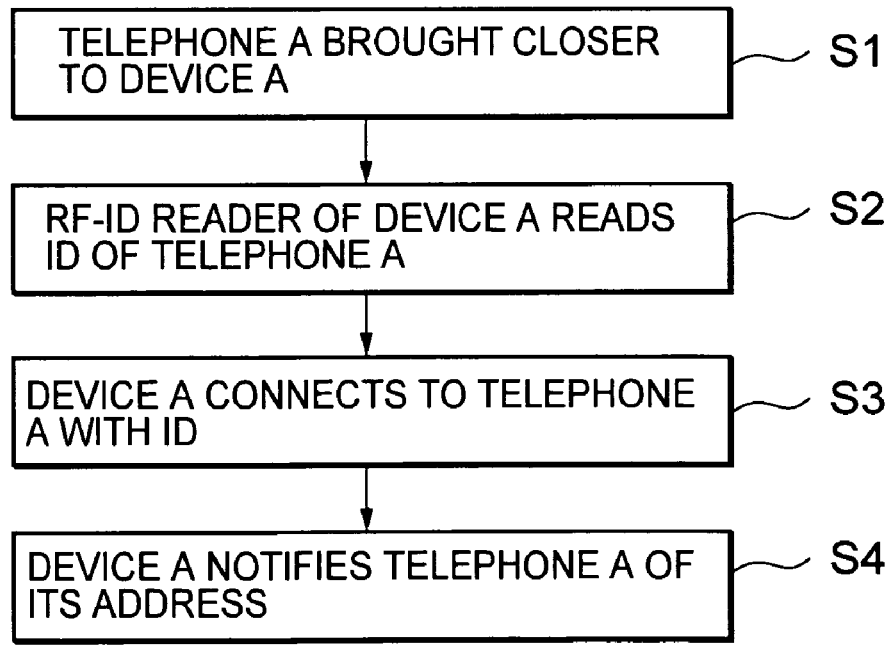
FIG. 9 is a flow chart showing a procedure of a cooperating operation of a telephone A and a device A operated by a user A when the RF-ID system is applied to the information communication system according to the present invention.

FIG. 9 shows a procedure of an associated operation of the telephone A manipulated by a user A and a device A in the form of a flowchart when an RF-ID system is applied to the information communications system according to the present embodiment.

When the device. A is brought closer to the telephone A (step S1), the RF-ID reader of the device A reads an ID signal from an RF-ID of the telephone A (step S2).

The ID signal is formed of an IP address of the telephone A, for example. The device A uses this IP address to establish network connection to the telephone A (step S5), and transmits an IP address of the device A (or another access method) (step S4).

Next, detailed description is made for operations to realize information sharing/information exchange with a partner with whom a conversation is being held by telephone in the information communication system according to the present embodiment.

Figure 10:
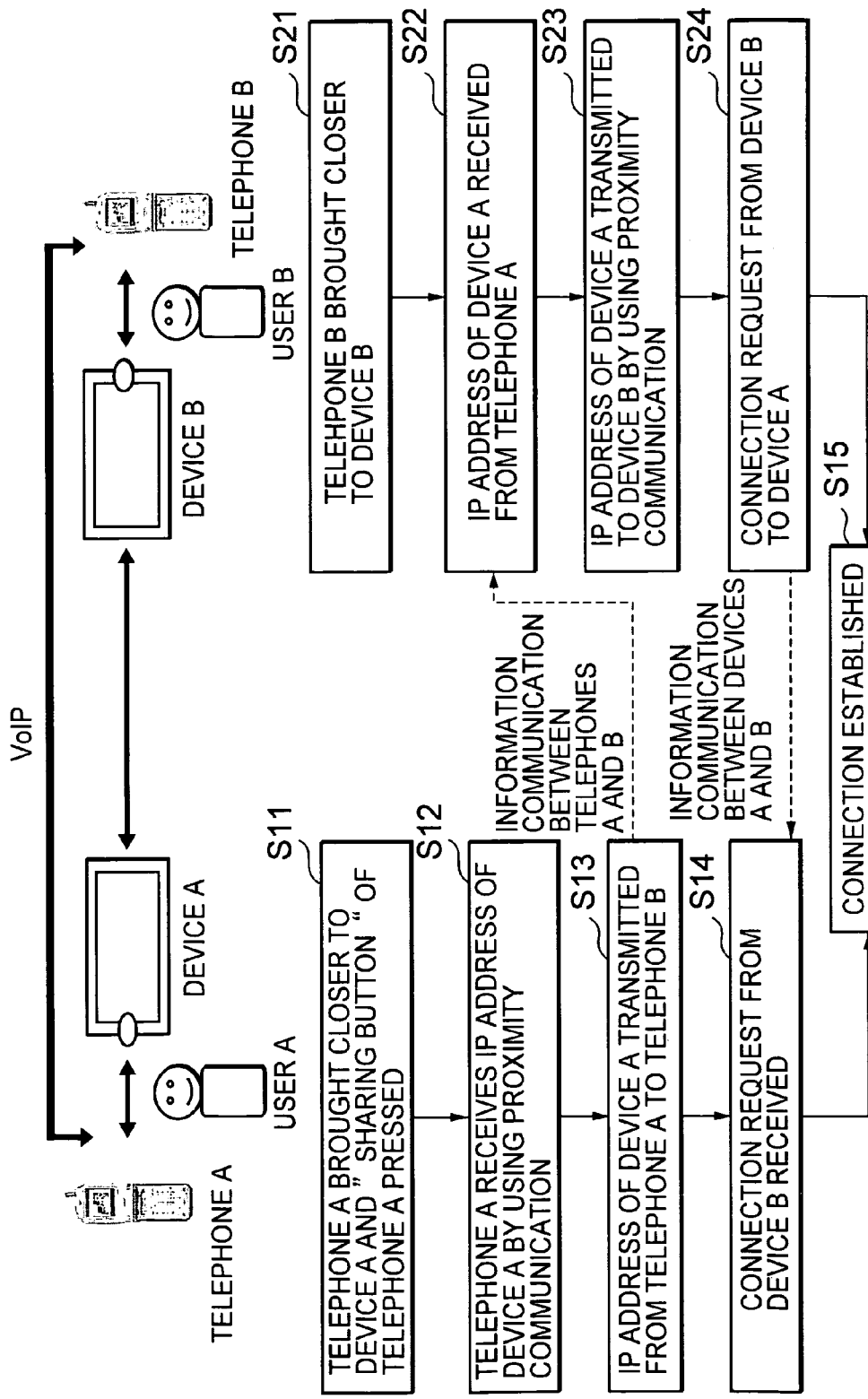
FIG. 10 is a flow chart showing a procedure for establishing connection between electronic devices used by each person with a person with whom a conversation is being held by telephone through a cooperating operation of a telephone set and an electronic device in proximity thereto.

FIG. 10 shows a procedure in the form of a flow chart for establishing connection with a person with whom a conversation is being held by telephone between electronic devices used by each person through an associated operation of a telephone and an electronic device in proximity thereto.

In an example shown in FIG. 10, however, the users A and B are having a conversation over their telephones A and B. The telephone herein employs VoIP which is a telephone network constructed on the basis of an IP protocol on the Internet is used. In addition, the respective users A and B are using the devices A and B in proximity to their telephones A and B. The procedure described below is actually realized in the form of execution of predetermined programs on the telephones A and B used by the respective users A and B, and the devices A and B.

The user A brings his/her telephone A closer to the device A and presses "a sharing button" disposed as the input section 56 of the telephone A (step S11).

The telephone A receives an IP address of the device A therefrom by using the proximity communication interface (step S12). The proximity communication interface herein referred to include an infrared communication system, an electromagnetic induction coupling system, an electrostatic induction system and the like in addition to the RF-ID system (as described above).

Next, the telephone A calls the telephone B on the side of the user B to transmit the IP address of the device A (step S13).

On the other hand, the user B which is a communication partner of the user A also keeps his/her telephone B closer to the device B (step S21).

When the telephone B is called by the telephone A and receives the IP address of the device A (step S22), it uses the proximity communication interface to transmit the IP address of the device A to the device B (step S23).

The device B issues a connection request via the network to the device A (step S24).

When the device A receives the connection request from the device B (step S14), connection is established between the devices A and B (step S15).

According to the information communication system as shown in FIG. 10, it is possible to realize information sharing/information exchange with a partner with whom a conversation is being held by telephone through an easy operation. However, since only the partner addresses are exchanged via a secure telephone network in these operations, the information actually transmitted between the devices A and B cannot be protected from an external third party. When confidentiality of communication is to be ensured, a key for encryption also needs to be shared with the telephone partner, and it is very complicated to perform this by information exchange verbally in conversation and manual input.

Figure 11:
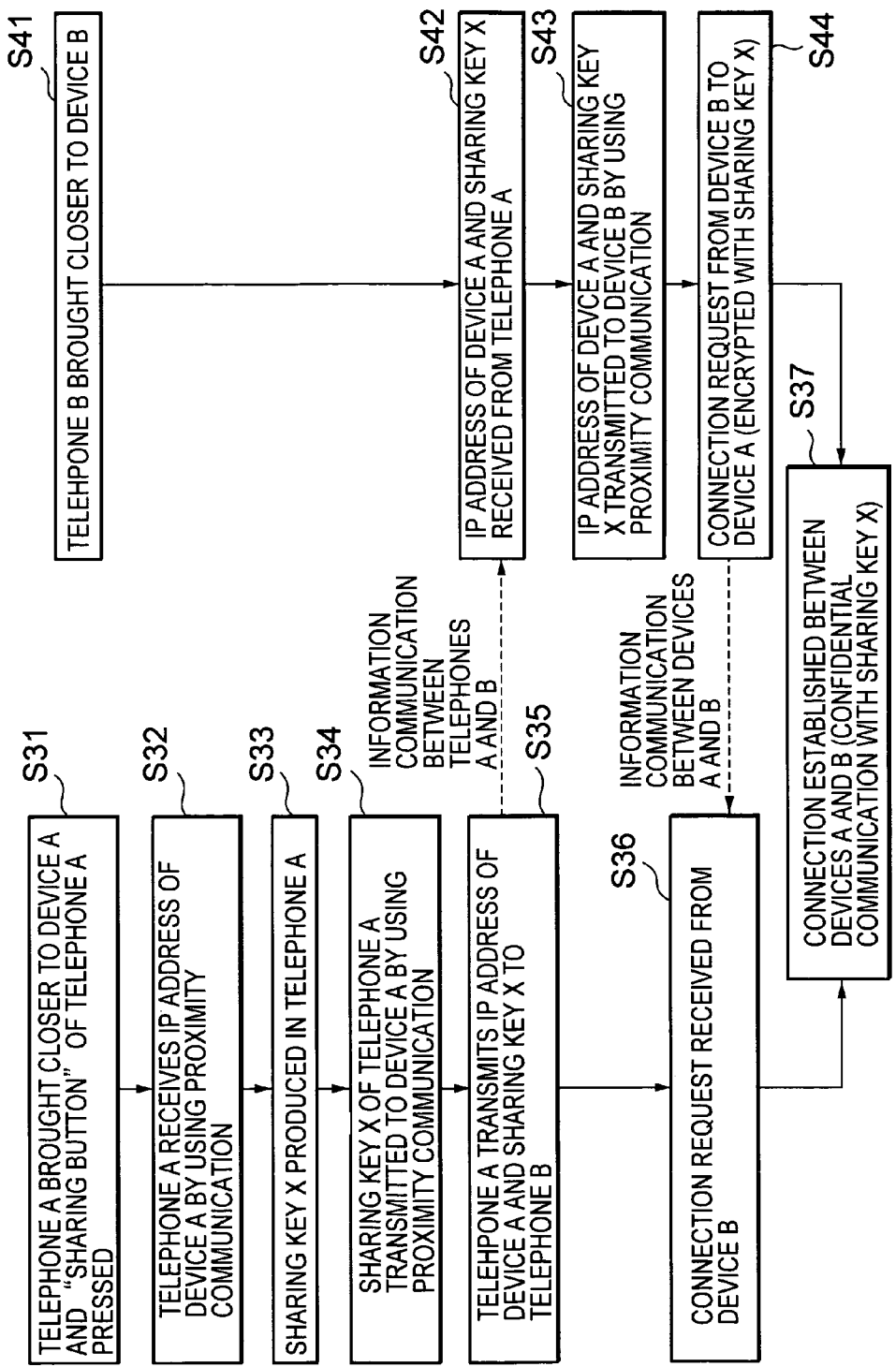
FIG. 11 is a flow chart of a procedure for establishing connection allowing confidential communication between electronic devices used by communication partners during a conversation by telephone.

FIG. 11 shows a procedure for establishing connection in which confidential communication is possible between electronic devices used by respective communication partners during a conversation by telephone in the form of a flow chart.

In this case, it is assumed that the users A and B are having a conversation by telephone over their telephones A and B. In addition, the respective users A and B are using the devices in proximity to their telephones A and B. The procedure hereinafter described is actually realized in the form of execution of predetermined programs on the telephones A and B used by the respective users A and B, and the devices A and B.

The user A brings his/her telephone A closer to the device A and presses "a sharing button" disposed as the input section 56 of the telephone A (step S31).

The telephone A receives an IP address of the device A therefrom by using the proximity communication interface (step S32). The proximity communication interface herein referred to include an infrared communication system, an electromagnetic induction coupling system, an electrostatic induction system and the like in addition to the RF-ID system (as described above).

Next, a sharing key X is produced in the telephone A (step S33). Then, the proximity communication is utilized to transmit the sharing key X of the telephone A to the device A (step S34).

Then, the telephone A calls the telephone B on the side of the user B to transmit the IP address of the device A and the sharing key X (step S35).

On the other hand, the user B which is a communication partner of the user A also brings his/her telephone B closer to the device B (step S41).

When the telephone B is called by the telephone A and receives the IP address of the device A and the sharing key X (step S42), it uses the proximity communication interface to transmit the IP address of the device A and the sharing key X to the device B (step S43). According to the present embodiment, the sharing key X for concealing information communication between the devices A and B can be securely transmitted over the telephone network.

The device B issues a connection request via the network to the device A (step S44). This connection request is performed through a secure communication path encrypted by the sharing key X.

When the device A receives the connection request from the device B (step S36), connection is established between the devices A and B (step S37). As a result, it is possible to realize confidential communication encrypted by the securely transmitted sharing key X between the devices A and B.

Thus, according to the procedure shown in FIG. 11, the information communication system can realize information sharing/information exchange with a partner with whom a conversation is being held by telephone and ensures confidentiality of communication through an easy operation.

In the aforementioned description, since the telephone A to the telephone B function as IP telephones, IP address transmission can be performed through the Internet connection established between the telephone A and the telephone B. On the other hand, when the telephone A and the telephone B are telephones which are connected through exchanges over a telephone network of a conventional system, data can be transmitted through voice connection between the telephone A and the telephone B. For example, data can be transmitted by using a touch-tone function of the telephone (DTMF), or data can be transmitted by using voice waveforms modulated in accordance with the data as used in a modem. Thus, the present invention can be realized not only by the IP telephone but also by the conventional public telephone network.

In this manner, in the information communication system according to the present invention, information sharing and information exchange can be performed with a partner with whom a conversation is being held by telephone through a cooperating operation of a telephone and an electronic device in proximity thereto. In the following, some utilization examples of the information communication system according to the present invention are introduced.

1. Application to Sharing Blackboard

The sharing blackboard is a system which allows sharing of contents of drawing or other interaction on a work screen presented in each remote information device.

Figure 12:
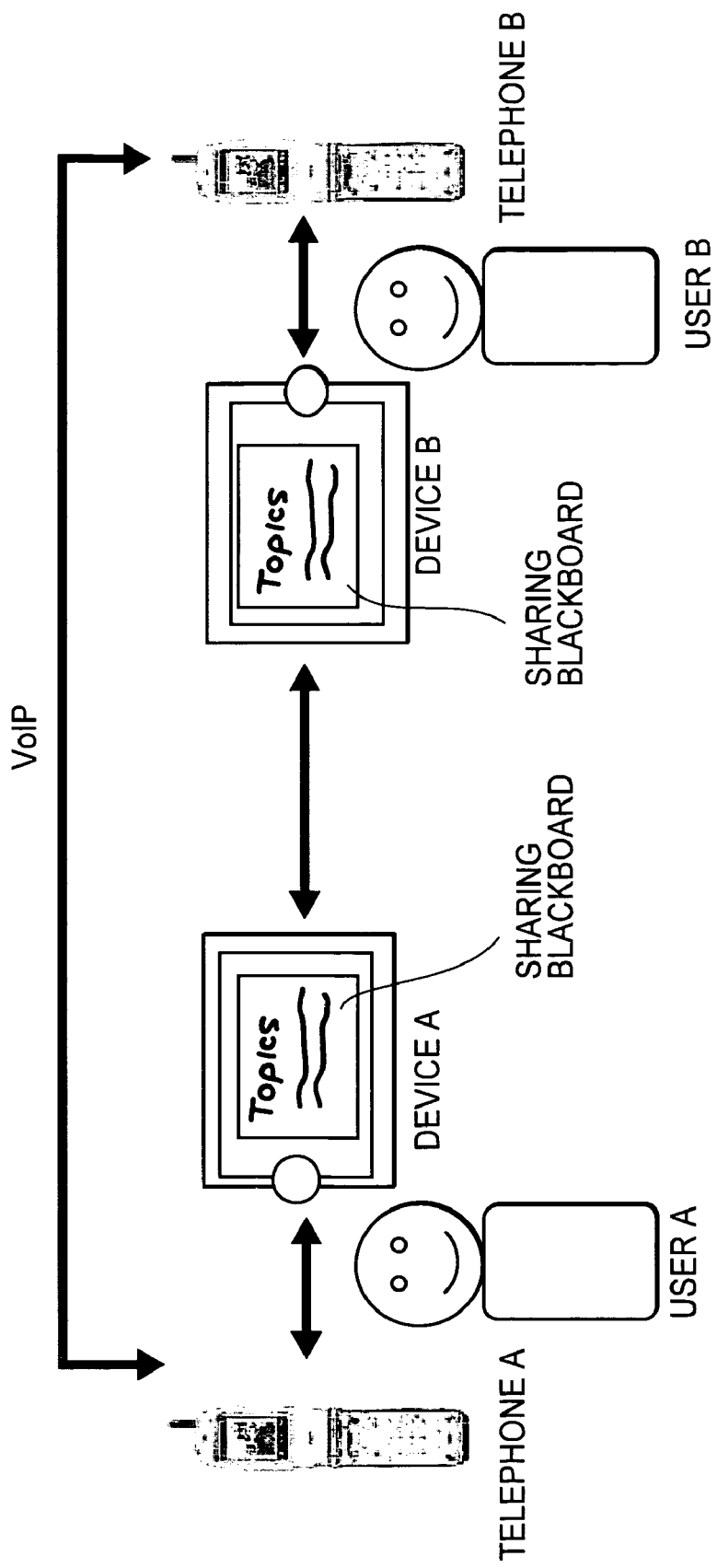
FIG. 12 is a diagram showing how to introduce a sharing blackboard into the information communication system according to the present invention.

When the sharing blackboard is introduced to the information communication system according to the present invention, two persons who are having a conversation by telephone (that is, the devices A and B) start a sharing blackboard application (see FIG. 12).

When both persons do not need to check IP addresses of the respective devices (the telephones A and B, the devices A and B) or the like and they only wish to use the telephone as a sharing blackboard, they have only to bring the telephone closer to the device A or B.

2. Application to File Exchange

Figure 13:
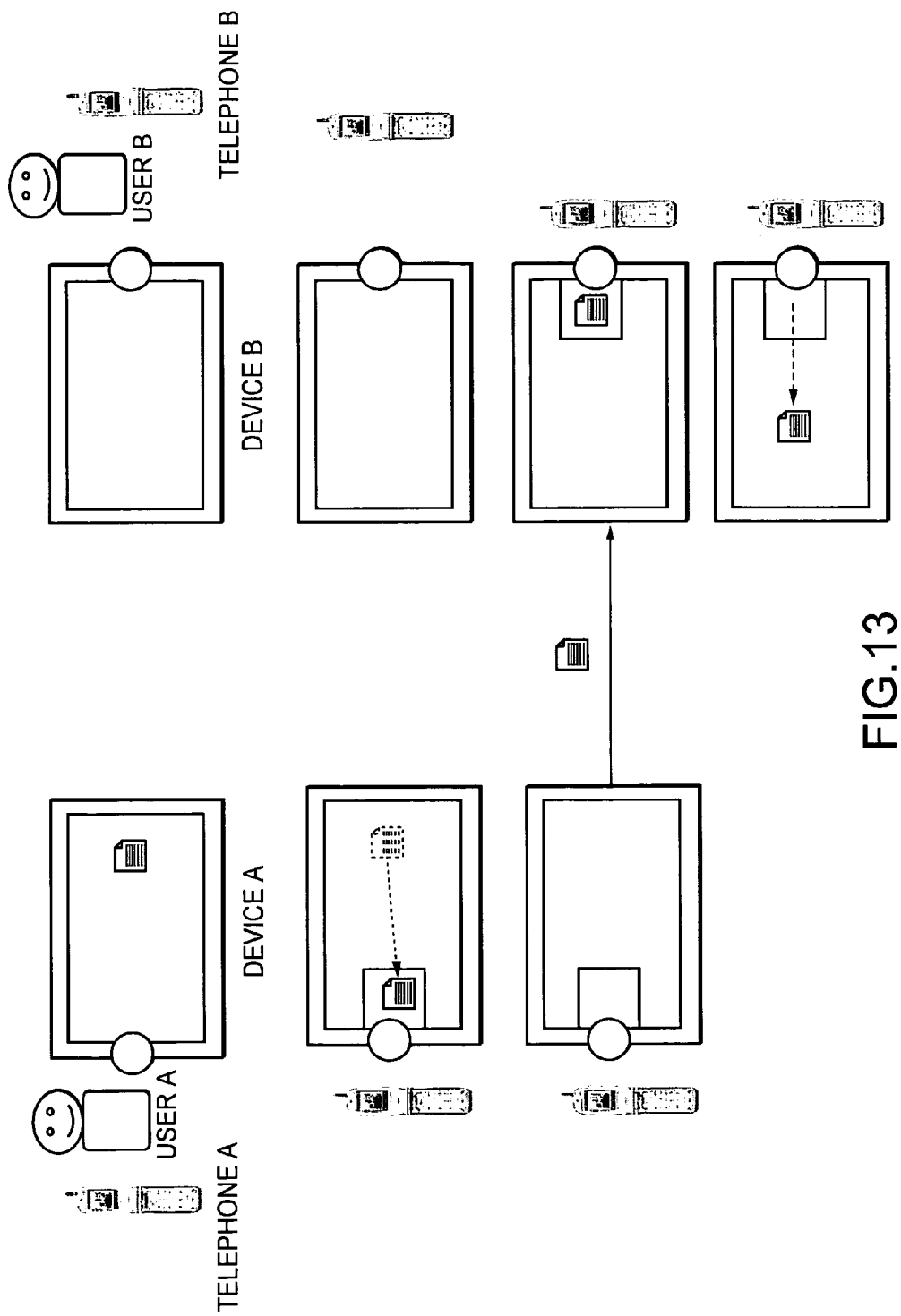
FIG. 13 is a diagram showing how to perform file exchange between devices operating in association with telephones by using the information communication system according to the present invention.

FIG. 13 shows how a file is exchanged between the devices operating in association with the telephones by using the information communication system according to the present invention. However, in an example shown in FIG. 13, it is assumed that a file stored in a local disk of the device A is transmitted to the remote device B.

When the telephone A is brought closer to the device A, this serves as a trigger to open a file transfer window corresponding to the telephone A on a screen of the device A.

The user A uses a GUI (Graphical User Interface) function provided by the device A and drags and drops an icon of a file to be transmitted into the file transfer window.

On the other hand, on the side of the user B, when the telephone B is brought closer to the device B, a file transfer window is opened similarly.

The entity of the file dropped into the file transfer window on the side of the device A is transferred to the device B via the Internet connection established between the device A and the device B.

Thus, a file icon appears in the file transfer window on the side of the device B. The user B drags this file icon to the desktop screen to complete the transfer processing of the file.

3. Application to Streaming Playback

When sounds or video images are delivered on the Internet, a "streaming" technique has been developed and is starting to be popular in which a user reproduces a file while downloading it, rather than reproduction after completion of download of a file. With broadband communication or always-on becoming widespread, streaming delivery is considered as a key in the next-generation use of the Internet.

Figure 14:
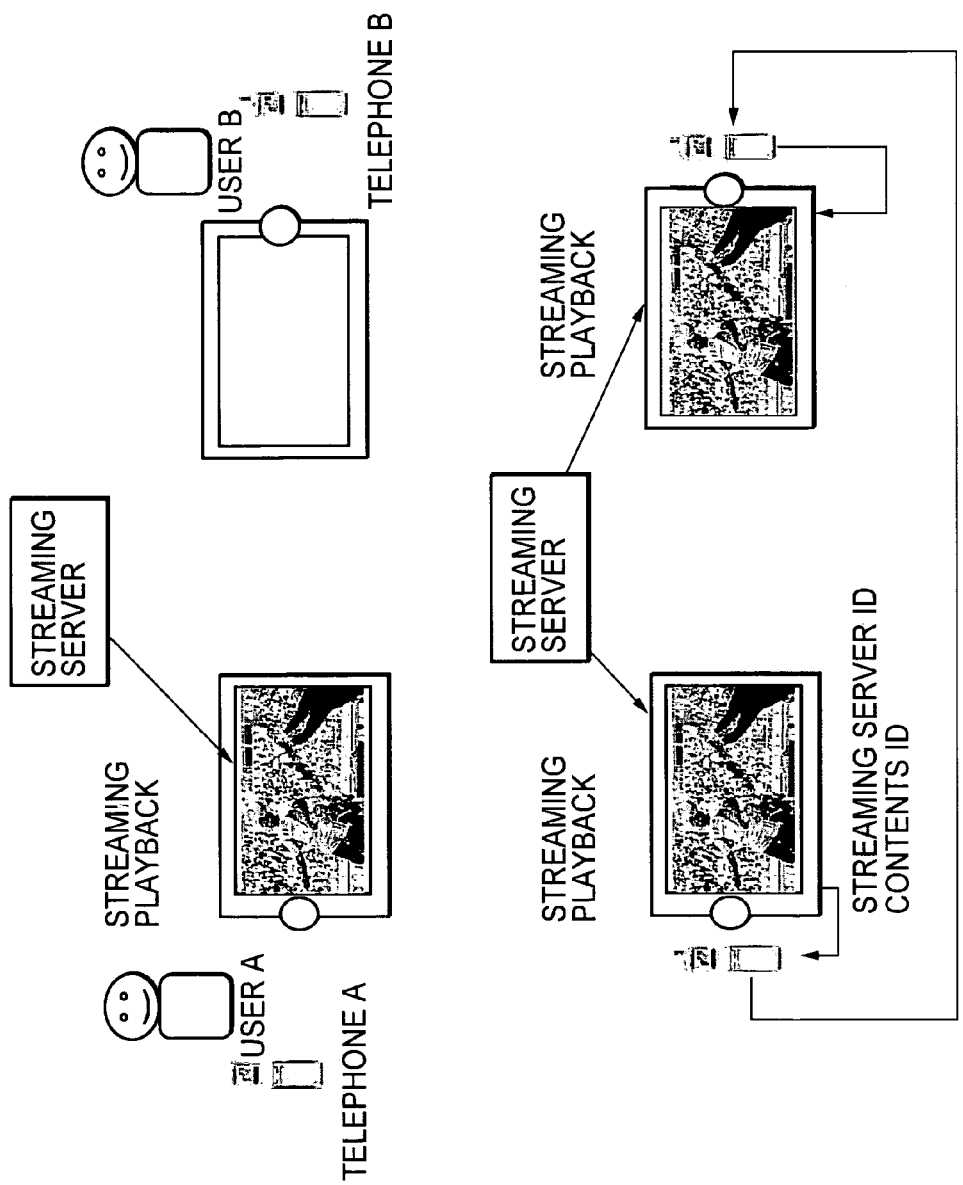
FIG. 14 is a diagram showing how to share streaming playback with a person with whom a conversation is being held by telephone by using the information communication system according to the present invention.

FIG. 14 shows how to share streaming playback with a partner with whom a conversation is being held by telephone by using the information communication system according to the present invention.

In the device A in proximity to the telephone A, streaming playback (for example, video delivery) is being performed.

The user A brings the telephone A closer to the device A to obtain information required for reproduction of that streaming video such as an ID of the streaming video (an IP address of a streaming server, an ID number of streaming contents or the like) from the device A.

Then, the information required for the streaming reproduction is transmitted to the device B via connection from the telephone A to the telephone B.

Through such easy operations, both persons can share streaming broadcast with easy operations.

4. Extension to Videophone

For example, a need exists that one wishes communication with a partner with whom a conversation is being held by a mobile phone through another medium such as an images other than voice.

When the information communication system according to the present invention is utilized, a conversation by telephone can be extended to a videophone as required with the cooperating operation of the telephone and the device.

Figure 15:
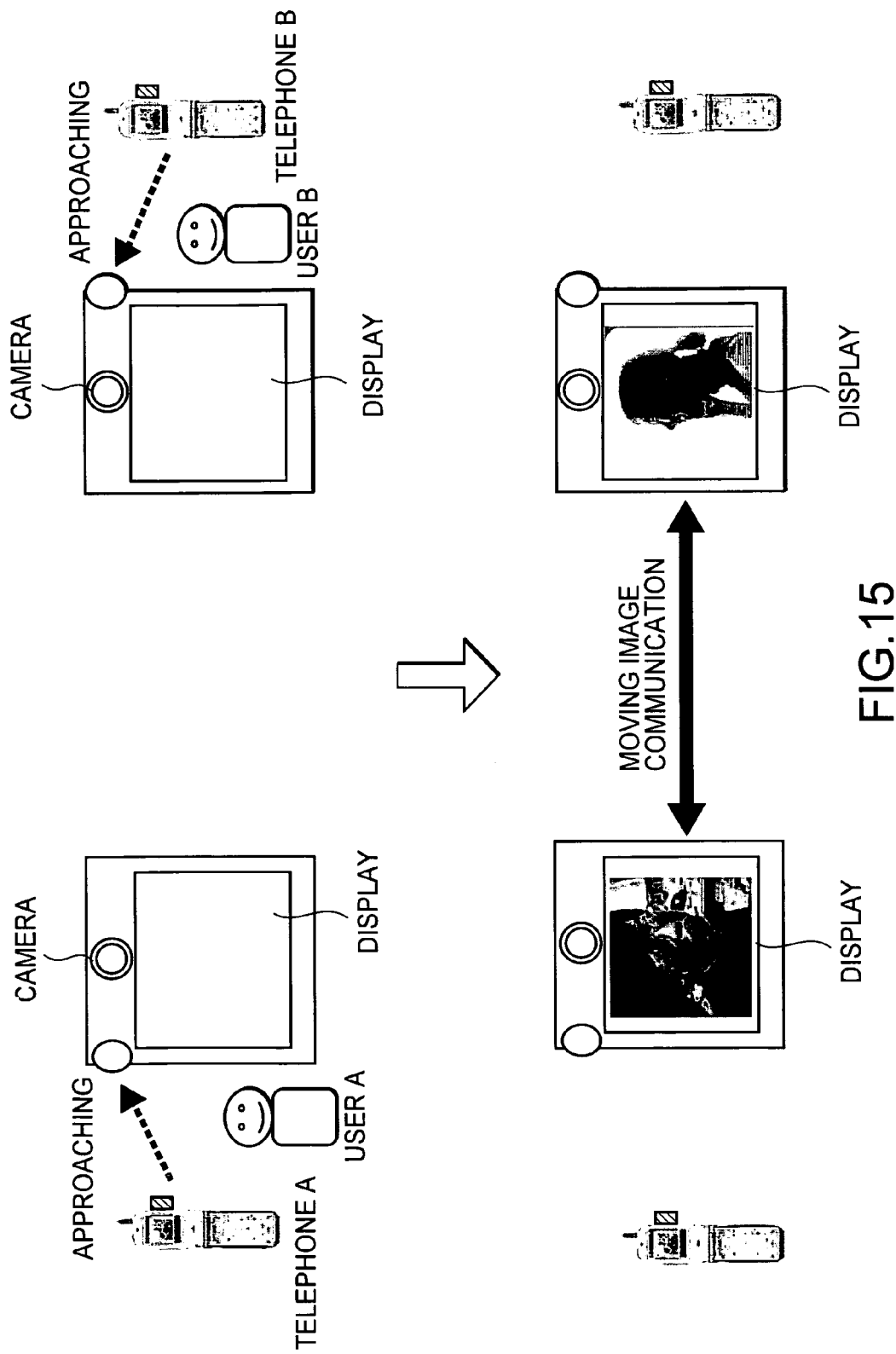
FIG. 15 is a diagram showing how to extend a conversation by telephone to a videophone by using the information communication system according to the present invention.

FIG. 15 shows how to extend a conversation by telephone to a videophone by using the information communication system according to the present invention.

During a conversation by a mobile phone, as shown, one comes in front of a device of an integral type of a camera and a display and brings the mobile phone used for the conversation in proximity thereto.

In response thereto, a network address is transmitted and received over the mobile phone to allow image communication between the devices. In other words, even when a conversation is started only with voice on the mobile phone at first, it can be extended to a videophone as required.

Supplement

As described above, the present invention has been described in detail with reference to the specific embodiment. However, it is apparent that those skilled in the art can perform modifications or substitutions of the embodiments without departing from the scope of the present invention. In other words, the present invention has been disclosed in the form of illustration, and the disclosure should not be interpreted as limitation. To determine the scope of the present invention, the field of claims should be taken into account.

INDUSTRIAL AVAILABILITY

According to the present invention, it is possible to provide an excellent information communication system, an information communication apparatus and an information communication method, and a computer program which allow information sharing and information exchange with a partner with whom a conversation is being held by telephone through a cooperating operation of a telephone and an electronic device in proximity thereto.

In addition, according to the present invention, it is possible to provide an excellent information communication system, an information communication apparatus and an information communication method, and a computer program for realizing information sharing/information exchange with a person with whom a conversation is being held by telephone through an easy operation and for allowing confidentiality of communication to be ensured.

What is claimed is:

1. An information communication system for performing an information exchange comprising:
   a first telephone;
   a first device;
   first proximity communication means activated by the first telephone when the first telephone is brought close to the first device, wherein the first proximity communication means connects the first telephone and the first device;
   a second telephone;
   a second device;
   second proximity communication means activated by the second telephone when the second telephone is brought close to the second device, wherein the second proximity communication means connects the second telephone and the second device;
   a wide area transmission path that connects the first device with the second device;
   reading means for reading, by the first telephone, an access method from the first device, wherein the access method specifies the first device;
   first cooperating means for transmitting, through a telephone network, the access method from the first telephone to the second telephone;
   second cooperating means for notifying, by the second telephone using the second proximity communication means, the second device of the access method;
   third cooperating means for establishing a connection over the wide area transmission path between the first device and the second device using the access method; and
   display means for displaying, on the first device and on the second device, information that is shared between the first device and the second device using the connection, wherein at least one of a user of the first device or a user of the second device can interact with the information while the information is being shared.

2. The information communication system according to claim 1, wherein the first cooperating means transmits an encryption key for use in information communication through the wide area transmission path.

3. The information communication system according to claim 1, wherein the first proximity communication means or the second proximity communication means comprises at least one of an infrared communication, an electromagnetic induction coupling, an electrostatic coupling, or a RF-ID.

4. The information communication system according to claim 1, further comprising means for sharing, between the first device and the second device using the connection, user interaction performed on the first device and the second device.

5. The information communication system according to claim 1, further comprising means for transferring a file between the first device and the second device using the connection.

6. The information communication system according to claim 1, further comprising means for transferring, between the first device and the second device using the connection, an access method to contents provided on the wide area network.

7. The information communication system according to claim 1, further comprising means for transferring, between the first device and the second device using the connection, contents acquired in one of the first device and the second device.

8. An information communication apparatus for performing information sharing through an associated operation of the apparatus and a first device in proximity thereto, comprising:
   telephone communication means for performing communication through a telephone network;
   proximity communication means for making a connection with the first device;
   access method acquiring means for acquiring, using the proximity communication means, an access method that specifies the first device, wherein the first device is connected to a wide area network; and
   access method transmitting means for transmitting, through the telephone network, the access method to a telephone, wherein
   shared information is displayed on the first device and on the second device, the first device and a second device being connected using the access method, and at least one user of the first device or the second device can interact with the information while the information is being shared.

9. The information communication apparatus according to claim 8, further comprising:
   encryption producing means for producing an encryption key for use in information communication through the wide area network, wherein the access method transmitting means transmits the encryption key to the telephone.

10. The information communication apparatus according to claim 8, further comprising:
    access method receiving means for receiving a second access method from the telephone, wherein the second access method specifies a method for connecting to a second device over the wide area network, and wherein the telephone is in proximity to the second device; and
    access method notifying means for notifying the first device of the second access method.

11. The information communication apparatus according to claim 8, wherein the proximity communication means comprises at least one of an infrared communication, an electromagnetic induction coupling, an electrostatic coupling, or a RF-ID.

12. An information communication method for performing information sharing through a cooperating operation of an apparatus and a first device in proximity with a first telephone, comprising:

making a connection with the first device;

acquiring, using the connection, an access method that specifies the first device, wherein the first device is connected to a wide area network; and transmitting, through a telephone network, the access method to a second telephone, wherein shared information is displayed on the first device and on a second device, the first device and the second device being connected using the access method, and at least one of a user of the first device or a user of the second device can interact with the information while the information is being shared.

13. The information communication method according to claim 12, further comprising:

producing an encryption key for use in information communication through the wide area network; and transmitting encryption key to the second telephone.

14. The information communication method according to claim 12, further comprising:

receiving a second access method from the second telephone, wherein the second access method specifies a method for connecting to a second device over the wide area network; and notifying the first device of the second access method.

15. The information communication method according to claim 12, wherein the connection comprises at least one of an infrared communication, an electromagnetic induction coupling, an electrostatic coupling, or a RF-ID.

16. An information communication apparatus for performing information sharing with a device through a cooperating operation of the apparatus and a first telephone in proximity thereto, comprising:

proximity communication means for making a connection with the first telephone;

access method notifying means for notifying, using the connection, the first telephone of an access method that specifies the apparatus, wherein the apparatus is connected to a wide area network, the first telephone transmits the access method to a second telephone, and the second telephone transmits the access method to the device;

connection establishing means for establishing a second connection with the device through the wide area network; and display means for displaying, on the apparatus and on the device, information that is shared between the apparatus and the device using the second connection, wherein at least one of a user of the apparatus or a user of the device can interact with the information while the information is being shared.

17. The information communication apparatus according to claim 16, wherein the apparatus receives an encryption key from the first telephone and the apparatus uses the encryption key to encrypt information communication on the second connection.

18. The information communication apparatus according to claim 16, further comprising means for sharing user interaction performed on the apparatus and the first device between the apparatus and the first device using the second connection.

19. The information communication apparatus according to claim 16, further comprising means for transferring a file between the apparatus and the first device using the second connection.

20. The information communication apparatus according to claim 16, further comprising means for exchanging, using the second connection, a contents access method that specifies a method for obtaining contents provided on the wide area network.

21. The information communication apparatus according to claim 16, further comprising means for exchanging, using the second connection, contents acquired by the apparatus or the first device.

22. An information communication method for performing information sharing with a device through an associated operation with a first telephone in proximity to the device, comprising:

making a connection with the first telephone;

notifying, using the connection, the first telephone of an access method that specifies an apparatus, wherein the apparatus is connected to a wide area network, the first telephone transmits the access method to a second telephone, and the second telephone transmits the access method to the device;

establishing a second connection with the device through the wide area network; and displaying, on the apparatus and on the device, information that is shared between the apparatus and the device using the second connection, wherein at least one of a user of the apparatus or a user of the device can interact with the information while the information is being shared.

23. The information communication method according to claim 22, further comprising:

receiving, from the first telephone, an encryption key; and using the encryption key to encrypt information communication on the second connection.

24. The information communication method according to claim 22, further comprising sharing user interaction between the first device and the second device through the second connection.

25. The information communication method according to claim 22, further comprising transferring a file between the first device and the second device using the second connection.

26. The information communication method according to claim 22, further comprising exchanging a contents access method that specifies a method for obtaining contents provided on the wide area network.

27. The information communication method according to claim 22, further comprising exchanging, using the second connection, contents with the first device.

28. A transportable medium having a computer program for causing a computer to execute a method for performing information sharing through a cooperating operation with a first device in proximity with a telephone, the method comprising the steps of: making a connection with the first device; acquiring, using the connection, an access method that specifies the first device, wherein the first device is connected to a wide area network; and transmitting, through a telephone network, the access method to a second telephone, wherein shared information is displayed on the first device and on a second device, the first and second device being connected using the access method, wherein at least one of a user of the first device or a user of the second device can interact with the information while the information is being shared.

29. A transportable medium having a computer program for causing a computer to execute a method for performing information sharing with a device through a cooperating operation with a first telephone in proximity to the first device, the method comprising: making a connection with the first telephone; notifying, using the connection, the first telephone of an access method that specifies apparatus, wherein the apparatus is connected to a wide area network, the first telephone transmits the access method to a second telephone, and the second telephone transmits the access method to the device; establishing a second connection with the device through the wide area network using the access method; and displaying, on the apparatus and on the device, information that is shared between the apparatus and the device using the second connection, wherein at least, one of a user of the apparatus or a user of the device can interact with the information while the information is being shared.

* * * * *

UNITED STATES PATENT AND TRADEMARK OFFICE
CERTIFICATE OF CORRECTION

PATENT NO. : 7,526,252 B2
APPLICATION NO. : 10/495002
DATED : April 28, 2009
INVENTOR(S) : Junichi Rekimoto et al.

It is certified that error appears in the above-identified patent and that said Letters Patent is hereby corrected as shown below:

On the title page, item (54), change "INFORMATION COMMUNICATION SYSTEM INFORMATION COMMUNICATION DEVICE AND INFORMATION COMMUNICATION METHOD AND COMPUTER PROGRAM" to --INFORMATION COMMUNICATION SYSTEM, INFORMATION COMMUNICATION DEVICE AND INFORMATION COMMUNICATION METHOD, AND COMPUTER PROGRAM--.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,526,252 B2
APPLICATION NO. : 10/495002
DATED : April 28, 2009
INVENTOR(S) : Junichi Rekimoto et al.

It is certified that error appears in the above-identified patent and that said Letters Patent is hereby corrected as shown below:

On the title page, item (54) and Column 1, lines 1-4, change "INFORMATION COMMUNICATION SYSTEM INFORMATION COMMUNICATION DEVICE AND INFORMATION COMMUNICATION METHOD AND COMPUTER PROGRAM" to --INFORMATION COMMUNICATION SYSTEM, INFORMATION COMMUNICATION DEVICE AND INFORMATION COMMUNICATION METHOD, AND COMPUTER PROGRAM--.

This certificate supersedes the Certificate of Correction issued October 27, 2009.

Signed and Sealed this

Seventeenth Day of November, 2009

David J. Kappos
*Director of the United States Patent and Trademark Office*